United States Patent [19]

Namoto et al.

[11] 4,075,670
[45] Feb. 21, 1978

[54] TAPE AUTO-LOADING RECORDING AND REPRODUCING APPARATUS

[75] Inventors: Yoshiteru Namoto, Moriguchi; Hideki Sakumoto, Katano, both of Japan

[73] Assignee: Matsushita Electric Industrial Co., Ltd., Osaka, Japan

[21] Appl. No.: 658,759

[22] Filed: Feb. 17, 1976

[30] Foreign Application Priority Data

Feb. 19, 1975 Japan .................................. 50-21175
Aug. 4, 1975 Japan .................................. 50-95225

[51] Int. Cl.² ............................................. G11B 15/66
[52] U.S. Cl. ....................................... 360/85; 360/95
[58] Field of Search ................................. 360/95, 85

[56] References Cited

U.S. PATENT DOCUMENTS

| 3,764,757 | 10/1973 | Inaga | 360/85 |
| 3,784,761 | 1/1974 | Moritan | 360/95 X |
| 3,833,921 | 9/1974 | Kihara | 360/95 X |
| 3,864,742 | 2/1975 | Katoh | 360/85 |
| 3,969,766 | 7/1976 | Tanaka | 360/85 |

*Primary Examiner*—John H. Wolff
*Attorney, Agent, or Firm*—Stevens, Davis, Miller & Mosher

[57] ABSTRACT

A tape wrapping mechanism for a rotary head type VTR wherein a tape pulling post is provided on a rotary ring mounted rotatably on the outer periphery of the cylinder, a rotary ring is rotated so that the post rotates along the outer periphery of the cylinder to pull out the tape from the cassette and wrap it around the cylinder and the rotary force of the rotary ring is such that, when the magnetic tape is wrapped at a predetermined wrapping angle, a pinch roller is automatically pushed toward the capstan with the tape therebetween. With this mechanism, a state capable of recording and reproduction is realized and the abutment of the pinch roller against the capstan is automatically released by a reverse rotation of the rotary ring when switching from the recording-reproduction state to the stop state.

2 Claims, 15 Drawing Figures

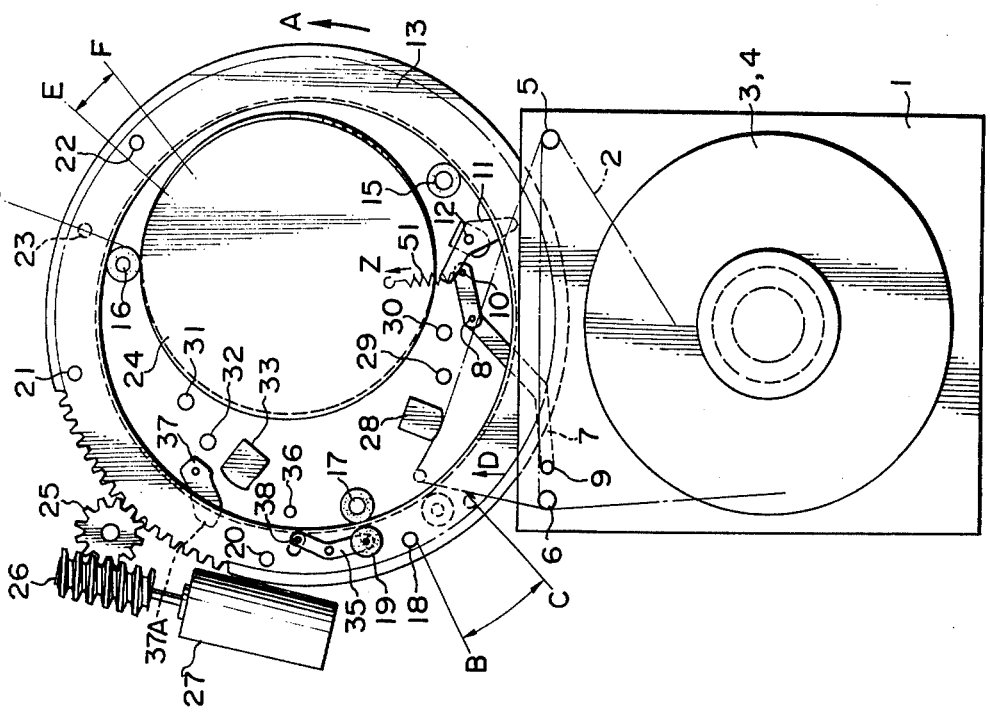
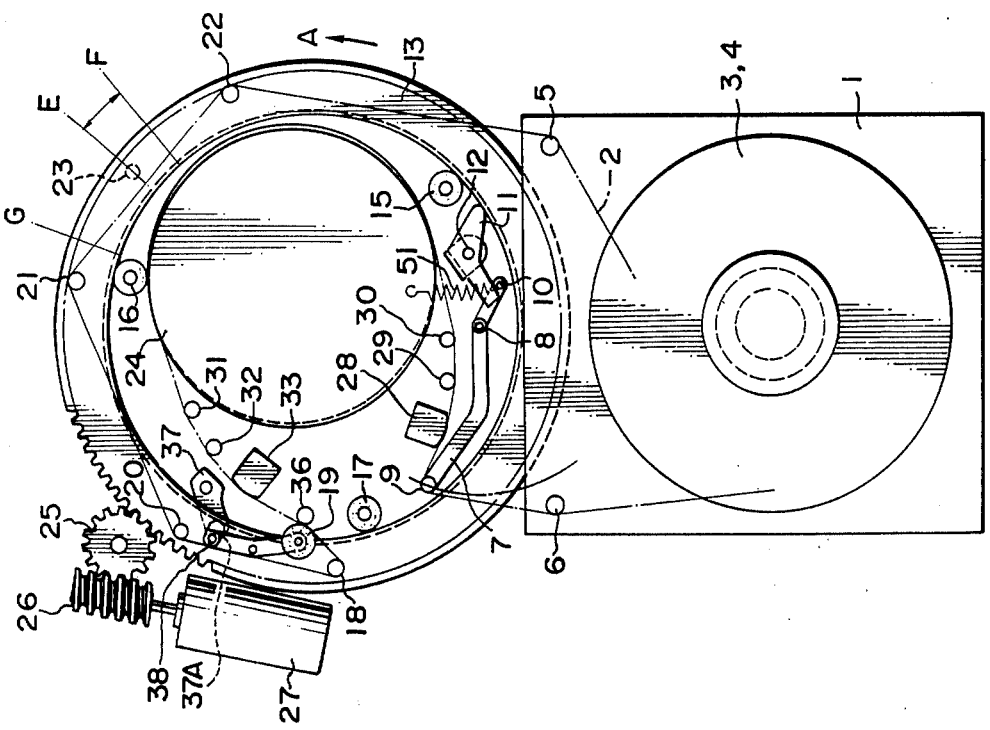

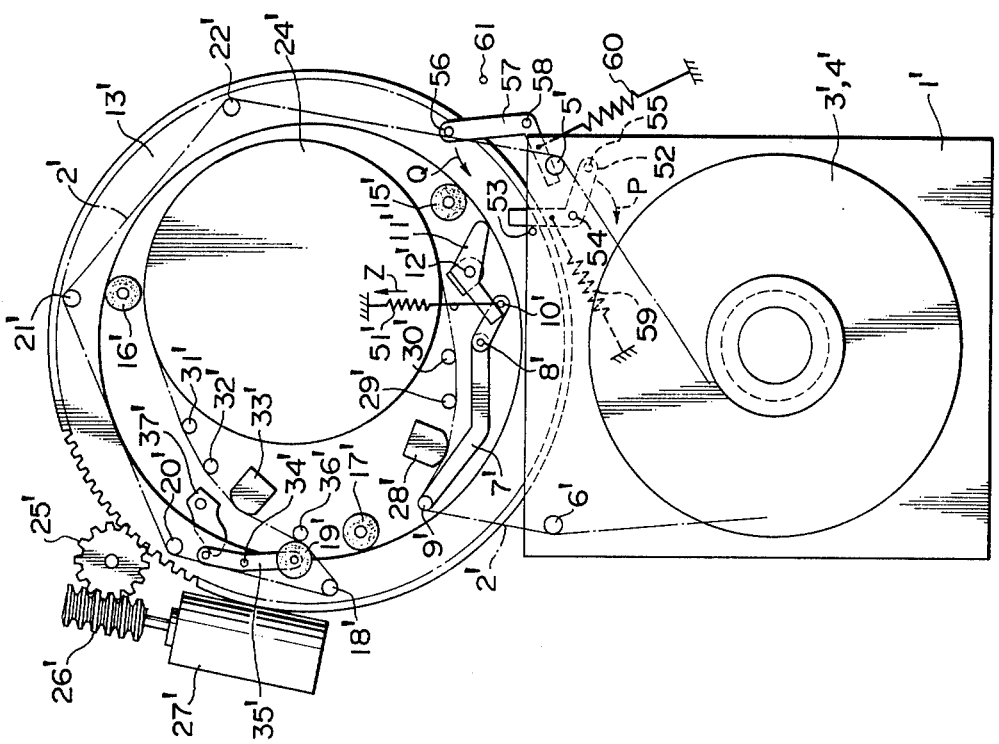
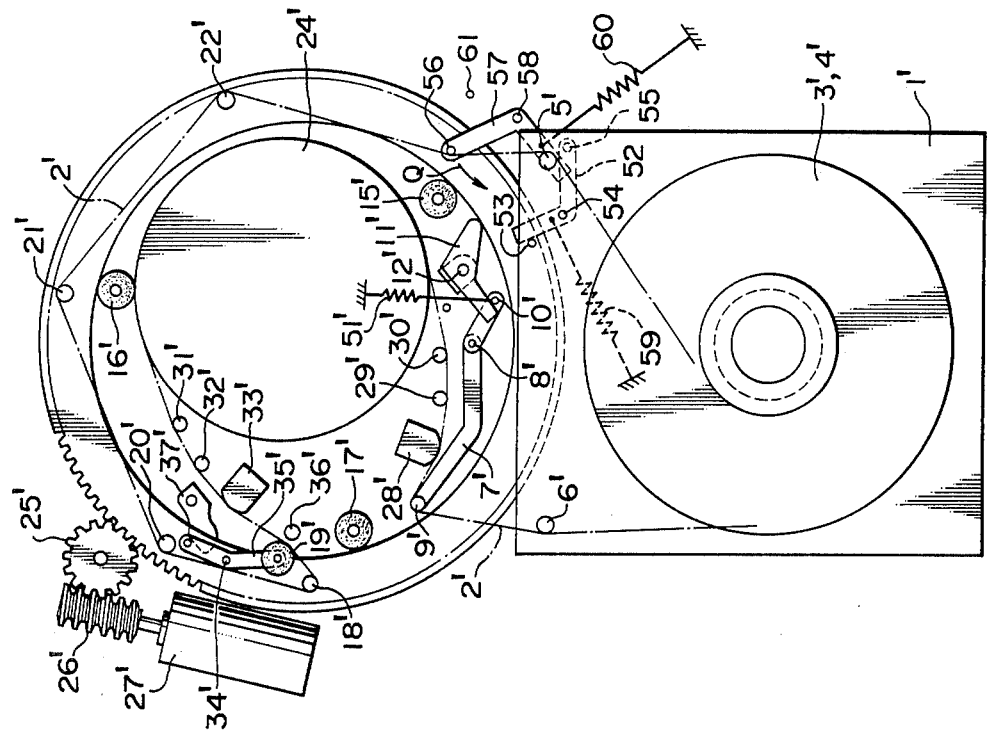

TAPE AUTO-LOADING RECORDING AND REPRODUCING APPARATUS

BACKGROUND OF THE INVENTION

1. Field of the Invention

This invention relates to a rotary head type magnetic recording and reproducing apparatus (VTR) of a helical scan system, wherein a magnetic tape is wrapped around a cylinder at a prescribed angle with a rotary trace on the rotary magnetic head so that recording and reproduction from the head and tape are done on a recording trace slanted with respect to the longitudinal direction of the tape.

2. Description of the Prior Art

A rotary head type VTR as well as a recorder aimed to record and reproduce a sound signal usually has a structure such that, after a cassette enclosing a magnetic tape is mounted on the VTR apparatus, the magnetic tape and the magnetic head are automatically placed in contact with each other to effect recording and reproduction. However, the rotary head type VTR differs from the recorder in that the magnetic tape should be wrapped around a cylinder enclosing the rotary head at a prescribed angle (about 180° in the case of a two head system). This requires a mechanism for pulling out the magnetic tape from the cassette and wrapping it around the cylinder.

SUMMARY OF THE INVENTION

Therefore, this invention provides a tape wrapping mechanism for a rotary head type VTR, wherein a tape pulling post is provided on a rotary ring mounted rotatably on the outer periphery of the cylinder. The rotary ring is rotated so that the post rotates along the outer periphery of the cylinder to pull out the tape from the cassette and wrap it around the cylinder. The rotary force of the rotary ring is such that, when the magnetic tape is wrapped at a predetermined wrapping angle, a pinch roller is automatically pushed toward the capstan with the tape therebetween, whereby a state capable of recording and reproduction is realized.

A further object of this invention is to automatically release the contact between the pinch roller and the capstan by a reverse rotation of the rotary ring when switching from the recording-reproduction state to the stop state.

BRIEF DESCRIPTION OF THE DRAWINGS

These and other objects, features and advantages of the present invention will be apparent from the following description taken in conjunction with the accompanying drawings, in which;

FIG. 1 is a plan view of a recording and reproducing apparatus according to one embodiment of this invention before loading.

FIG. 2 is a plan view of the same apparatus after loading (state of recording and reproduction).

FIG. 14 is a plan view of the apparatus shown in FIG. 13 in the recording-reproducing state.

FIG. 15 is a plan view of the apparatus shown in FIG. 13 in the stop state.

DESCRIPTION OF THE PREFERRED EMBODIMENTS

Figure 3:
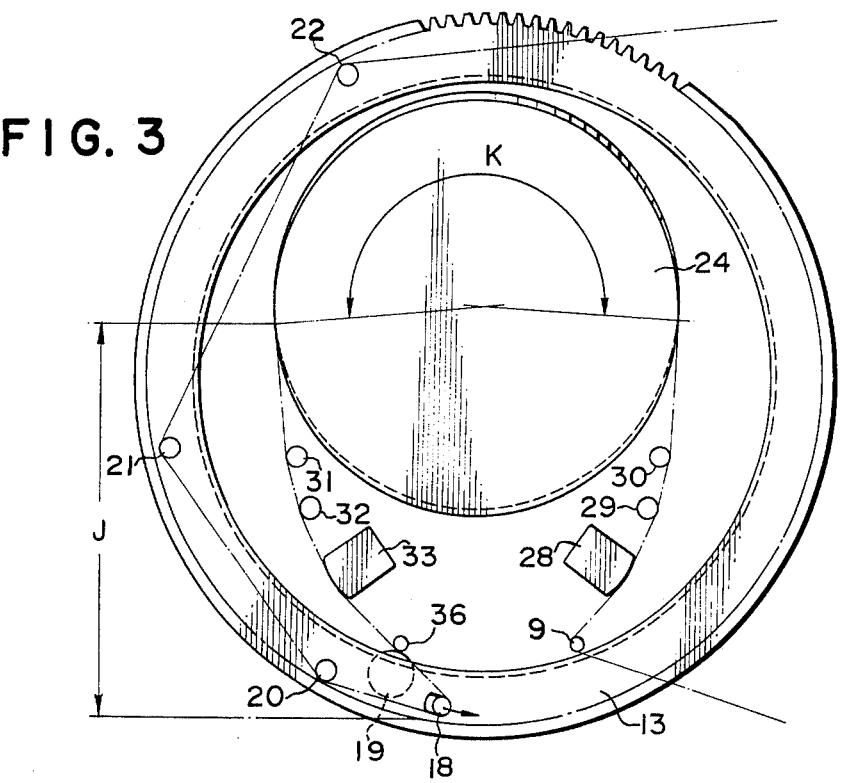
FIG. 3 is a plan view of the same apparatus showing the tape feeding system.
Figure 6:
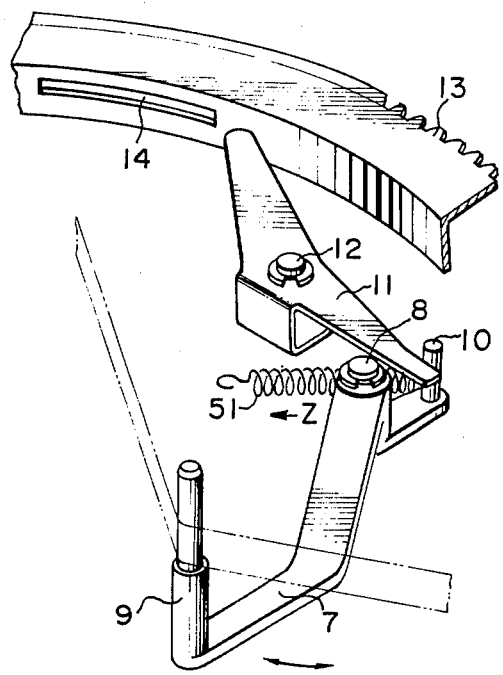
FIG. 6 is a perspective view showing an auxiliary pulling member of the same apparatus.
Figure 7:
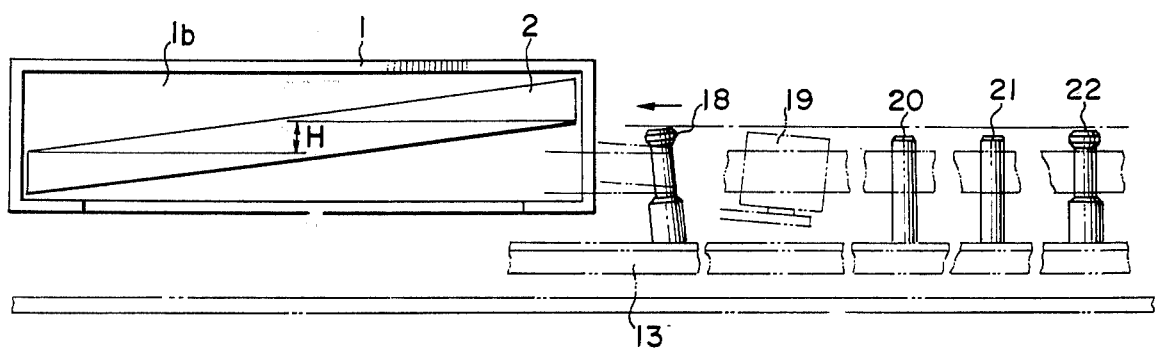
FIG. 7 shows the tape extending over the cassette opening of the same apparatus and the height relation between the pulling-out post on the rotary ring, the pinch roller and the guide post.

A detailed explanation of one embodiment of this invention will be made hereinafter referring to the drawings. Reference numeral 1 denotes a cassette which accommodates a supply reel 3 and a take-up reel 4 having a magnetic tape 2 wrapped therearound. These reels are coaxially superimposed in two stages so that they are independent from each other and rotatable. The magnetic tape 2 is stretched by guide posts 5 and 6 disposed between the reels, and faces an opening 1b which is provided on one side of the cassette, as shown in FIG. 7. Reference numeral 7 denotes an auxiliary pull-out arm which is mounted rotatably on a shaft 8. On one end of the arm 7, an auxiliary pull-out post 9 is mounted while on the other end a pin 10 is mounted which is biased by a spring 51 in the Z direction. Reference numeral 11 is a rotary lever which is held rotatably by a shaft 12. One end of the lever 11 is engaged with the pin 10 while the other end thereof is either pushed against the inner surface of the rotary ring 13, or positioned to go into a slot 14 provided on the rotary ring 13 as shown in FIG. 6. The rotary lever 11 is situated in the slot 14 of the rotary ring 13 before loading, as shown in FIG. 1. When the loading begins and the rotary ring starts to rotate, the lever 11 leaves the slot 14. At this time, the rotary lever 11 rotates in the counter-clockwise direction to rotate the auxiliary pull out arm 7 by pushing the pin 10 thereon. The auxiliary pull-out post 9 moves in the direction shown by the arrow D to pull out the tape. The rotary lever 11 is held in a position as shown in FIGS. 2 and 6. The auxiliary post 9 serves also to wrap the tape around an erase head 28 and tape position regulating posts 29 and 30 at a predetermined angle. At the end of the tape pull-out operation by the auxiliary post 9, the state of the tape is as shown by a one-dot chain line in FIG. 1. The rotary ring 13 is placed rotatably around the outer periphery of a cylinder 24 by holding rollers 15, 16 and 17, mounting thereon a pull-out post 18, a pinch roller 19, tape guide posts 20, 21 and 22 and further a micro switch-switching pin 23 extending downwards. The rotary ring 13 has an L-shaped cross section, as shown in FIG. 6. As shown in FIG. 7, the tape pull-out post 18, the pinch roller 19, and the guide posts 20, 21 and 22 have their top-end portion positioned lower than the lower side edge portion of the tape 2 just coming from the supply reel 3 positioned at the upper portion of the cassette, the tape being stretched obliquely to the opening of the cassette, but their top-end portions being positioned higher than the upper side edge portion of the tape 2 just entering the take-up reel 4 which is positioned at the lower portion of the cassette. By this arrangement, when the rotary ring 13 rotates in the direction shown by arrow A in FIGS. 1 and 2 at the time of loading, the post 18 moves under the portion of the tape 2 just having come out of the upper reel 3 and pulls or guides the portion of the tape just before it enters the lower reel 4. In order that, in the recording-reproducing state, the tape obliquely coming at about an angle twice the lead angle from the cylinder 24 housing a rotary head may be corrected in its moving direction to enter the take-up reel 4 in parallel therewith, the pull-out post 18 is provided on the rotary ring oblique therewith. Further, as shown in FIG. 3, the tape coming from the supply reel 3 is wrapped around the cylinder 24 with a wrapping angle K measured from the point where the tape begins to be in contact with the cylinder. Through this wrapping operation, the tape 2 is guided along the lead of the cylinder downwards by the lead angle. After the tape leaves the cylinder, it takes a distance J in the oblique direction during recording or reproduction. When the tape passes the pull-out post 18 and is in parallel with the take-up reel, the height of the tape is made equal to that of the tape around the take-up reel.

Figure 4:
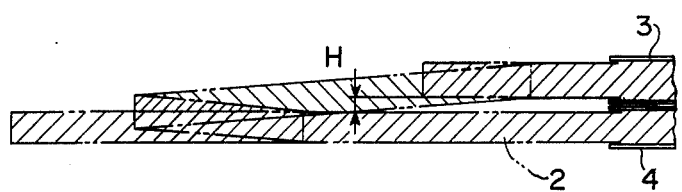
FIG. 4 shows a tape running position in the tape feeding system of the same apparatus.

The pinch roller 19 and the tape guide posts 20, 21 and 22 are mounted on the rotary ring 13 such that at the time of loading they come under the tape 2 at the initial intersection therewith and that they have the height relation with the running course of the tape to guide and drive the tape in recording or reproducing, as shown in FIG. 7. The tape guide posts 20, 21 and 22 are mounted perpendicularly to the rotary ring 13 which is provided parallel to a base plate. The supply and take-up reels 3 and 4 are positioned in superposed relation with a space H therebetween so that the tape pull-out post 18, the pinch roller 19 and the tape guide posts 20, 21 and 22 may pass under the tape and thereafter pull it out, as shown in FIGS. 4 and 7.

Figure 5:
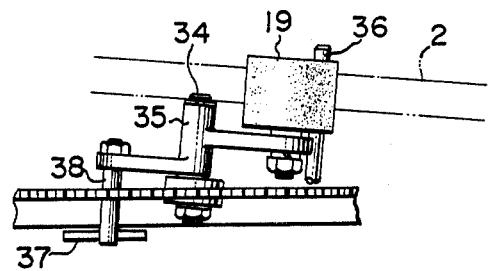
FIG. 5 is a side view showing a pinch roller section of the same apparatus.

The rotary ring 13 has a gear on its outer periphery. It is driven by a motor 27 through an intermediate gear 25 and a worm 26. The cylinder 24 is mounted slantingly on the base plate by the lead angle so that the tape coming from the supply reel 3 of the cassette 1 mounted in parallel with the base plate is made to run parallel to the base plate before the tape reaches the opening of the cylinder 24. When the tape 2 wrapped around the cylinder 24 leaves the cylinder, it comes out obliquely by an angle twice the lead angle, as shown in FIG. 5. Therefore, the pinch roller 19 is mounted on an idle end of the pinch roller mounting arm 35 which is provided rotatably on the shaft 34 standing obliquely on the rotary ring 13. At the other end of the pinch roller mounting arm 35, a pressure pin 38 for pushing the pinch roller 19 on the capstan 36 at the time of recording-reproducing is provided through the rotary ring 13. The pressure cam 37 is provided in a position where the pressure pin 38 can rotate the pinch roller 19 and press it against capstan 36 during recording and reproducing. In accordance with rotation of the rotary ring 13, the pressure pin 38 rotates and moves along the cam surface 37A and presses the pinch roller 19 against the capstan 36. Numeral 31 and 32 denote tape position regulating posts. Numeral 33 denotes a composite head including an audio head and a control head.

Next, the operation of the above arrangement according to one embodiment of this invention will be explained with reference to the electric circuits shown in FIGS. 8 to 12.

Figure 8:
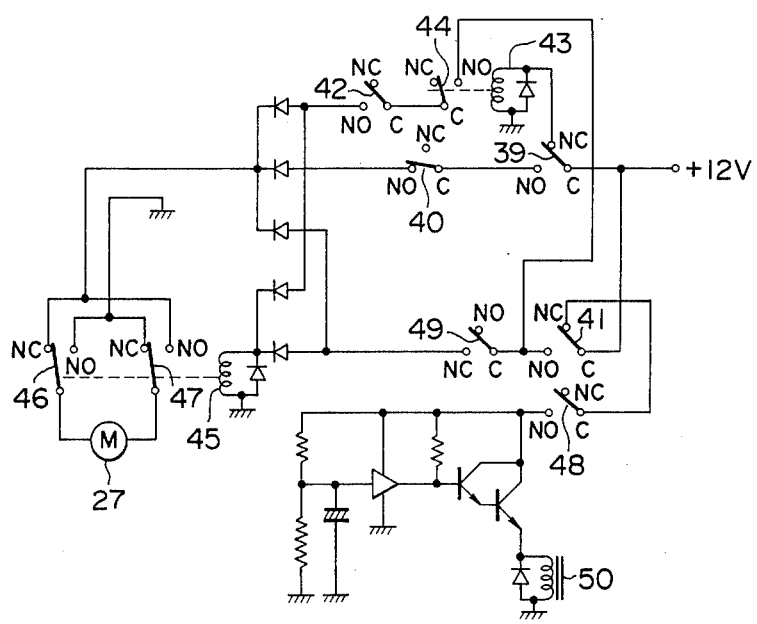
FIG. 8 is a diagram of a control circuit of the same apparatus.
Figure 9:
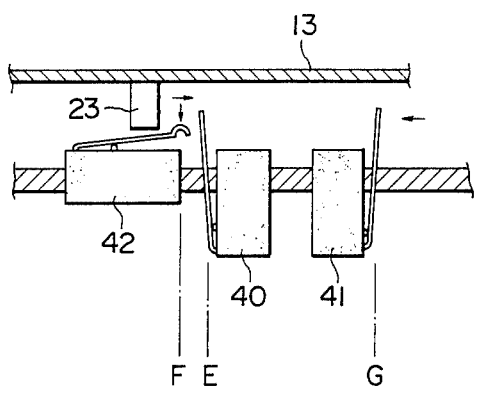
FIG. 9 is the view showing a relation between a detecting switch for detecting three rotary positions of the rotary ring 13 and a switching member of the same apparatus.
Figure 11:
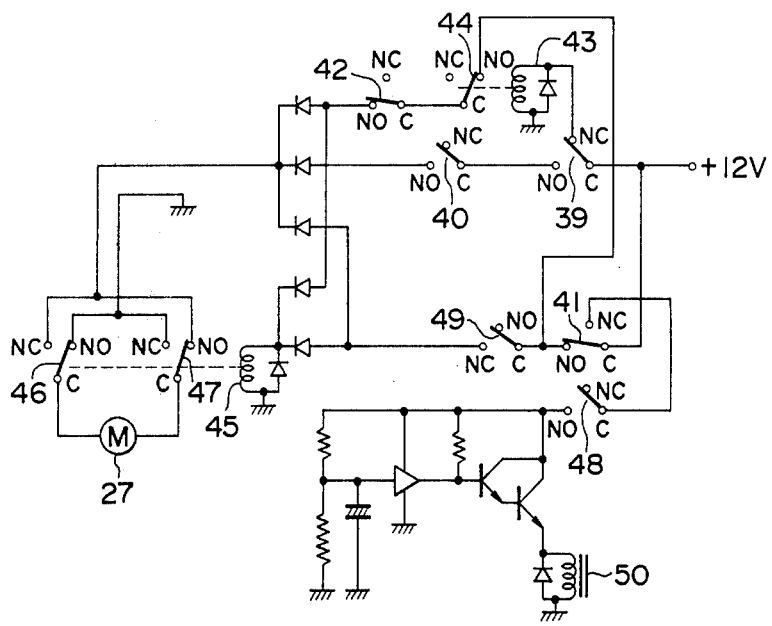
FIG. 11 is an electric circuit diagram showing the stop operation state of the control circuit of the same apparatus.

The positions of the switches are as follows. The switch 39 is a loading instruction switch, which with the start of the loading operation, is switched to the NO side. But, it is normally closed on the NC side as shown in FIG. 8. Reference numeral 40 denotes a recording-reproducing position detecting switch provided at a point E of FIG. 1. It is normally closed on the NO side, as shown in FIG. 8 but, is switched to the NC side as shown in FIG. 11 when the rotary ring 13 rotates to the recording-reproducing position and comes into contact with the micro switch switching pin 23 (see FIG. 9, wherein the pin 23 passes the switches 42, 40 and 41 in this order when the ring 23 rotates in the direction indicated by arrow A). Numeral 41 denotes a detecting switch for detecting the position of loading release termination (i.e. termination of the unloading operation), which is provided at a point G of FIG. 1. It is normally closed to the NC side, but is switched on the NO side (by the release from the engagement with the pin 23) from the start of the loading operation by the rotation of the rotary ring 13 until the release of loading is finished. 42 denotes a stop position detecting switch provided at a point F of FIG. 1, which is switched from the NC to the NO side by the micro switch switching pin 23 according to the rotation of the rotary ring. Under this condition, when the rotary ring 13 rotates and moves to the point E, the switch 40 is switched to a recording-reproducing state while the switch 42 is kept in the switched condition.

By instructing a stop operation, the rotary ring can be rotated in the reverse direction. When the detecting switch 40 is again switched to the NO side, the stop state is realized.

Numeral 48 and 49 designate switches which are ganged with the push buttons (not shown) for releasing the loading. In the normal state, they are closed on the NC and NO side respectively.

Figure 10:
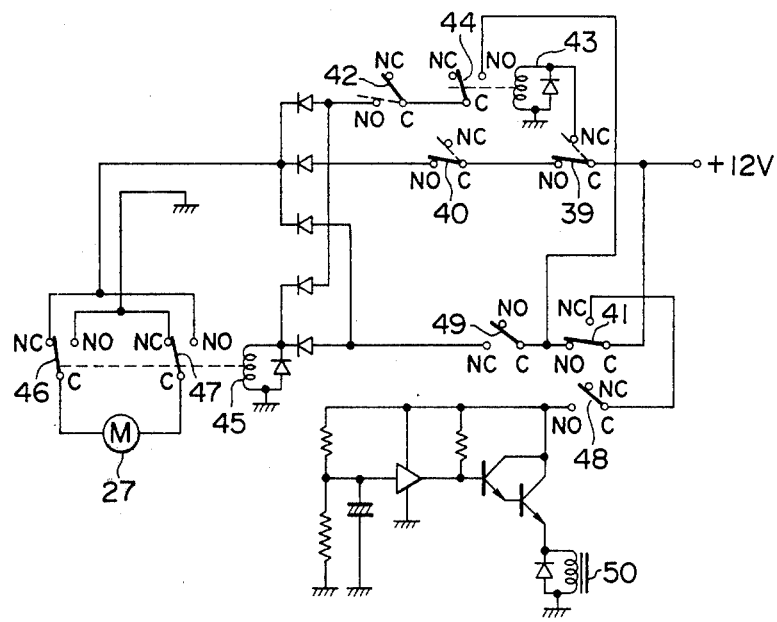
FIG. 10 is an electric circuit diagram showing the loading state of the control circuit of the same apparatus.

First a loading button (not shown) is pushed, the switch 39 ganged therewith changes its position to the NO side and electric power is supplied to the motor 27 through the recording-reproducing position detecting switch 40. The motor rotates in the normal direction to drive the rotary ring 13 in the direction shown by the arrow A. With this start of driving, the switch 41 for detecting the position of the loading-release termination is switched to the NO side. In a period in which the pull-out post 18 moves from the position B to C in accordance with the movement of the rotary ring, the tape 2 is pulled by the auxiliary post 9 out of the cassette 1, as shown by the one-dot chain line in FIG. 1. By a further rotary movement of the rotary ring 13, the pull-out post 18 passes under the tape 2 and enters the inner side of a tape loop formed by the auxiliary tape pull-out process. When the post 18 passes across the tape again, it hooks the tape and starts to pull out the tape. Following the post 18 having passed under the tape 2, the pinch roller 19 and the tape guide posts 20, 21 and 22 pass under the tape 2 sequentially, and a tape loop is formed by their rotary movement as shown in FIG. 2. By the movement of the rotary ring, the pressure pin 38 rides on the pressure cam 37 to rotate the arm 35 so that the pinch roller 19 is pressed against the capstan 36. After the movement of the switching pin 23 from the loading-starting position G to the loading-terminating position E by nearly one rotation of the rotary ring (see FIGS. 1 and 2), the pin 23 is pushed against the recording-reproducing position detecting switch 40 provided at E. The switch 40 is switched to the NC side to cut the power supply to the motor. As a result, the motor stops its rotation and the loading process finishes. During the movement of the pin 23, after it passes the position F, the stop position (a point where the pinch roller is positioned a little apart from the capstan) detecting switch 42 falls to the NO side, whereby recording and reproducing becomes possible (FIG. 10).

In order to interrupt recording or reproducing under this condition, a stop button (not shown) is pushed. The switch 39 ganged with the stop button is reset to the NC side. A relay 43 is energized and the switch 44 is switched to the NO side. The relay 45 switches the switches 46 and 47 to their NO sides so that the motor 27 and hence the rotary ring rotates in the reverse direction. By this reverse rotation, the pinch roller pressing pin 38 slides on the cam surface of the press cam 37, while the pinch roller 19 leaves the capstan 36, whereby the tape drive is stopped. The switch pin 23 moves from the position E to F and the stop position detecting switch 42 is reset to the NC side. The power supply to the motor 27 is stopped. The switches 46 and 47 are reset to the NC sides. Thus, the stop operation is finished.

Next, by selecting the recording-reproducing operation to the present arrangement conditioned at the stop position, the switch 39 is switched to the NO side. The motor 27 rotates in the normal direction, as in the case of the afore-mentioned loading process. The pinch roller 19 is pressed on the capstan 36 to make the tape run at a constant speed.

By instructing the unloading operation to the present arrangement at the above stop position, the ganged switches 48 and 49 transfer to the NO and NC sides respectively as shown in FIG. 11. Switches 46 and 47 are switched to the NO sides by relay 45. The motor rotates in the reverse direction and the rotary ring 13 is driven in the direction opposite to that in the case of the loading operation. At the same time, the take up reel is driven to take up the tape into the cassette.

With further advance of this rotation of the rotary ring, one end of the rotary lever 11 enters into the slot 14 provided in the rotary ring 13. The auxiliary pull-out post 9 rotates in the direction opposite to D, returning to the position before loading, as shown in FIG. 1. By a still further advance of the rotation of the rotary ring, the switch pin 23 returns to the position G (position of the loading-release termination) to be engaged with the switch 41, thereby transferring switch 41 to the NC side to stop rotation of the motor. Further, through a delay circuit a current flows through a solenoid 50, which operates to release a hook (not shown) of a loading release button and reset the switches 48 and 49 in an interlocking relation with the release of the hook. By the above-mentioned arrangement, the time required for the change from the recording-reproducing to the stop state and from the stop to the recording-reproducing is abridged, and moreover a simple and highly reliable control mechanism of the pressure contact between the pinch roller and the capstan is realized.

Figure 12:
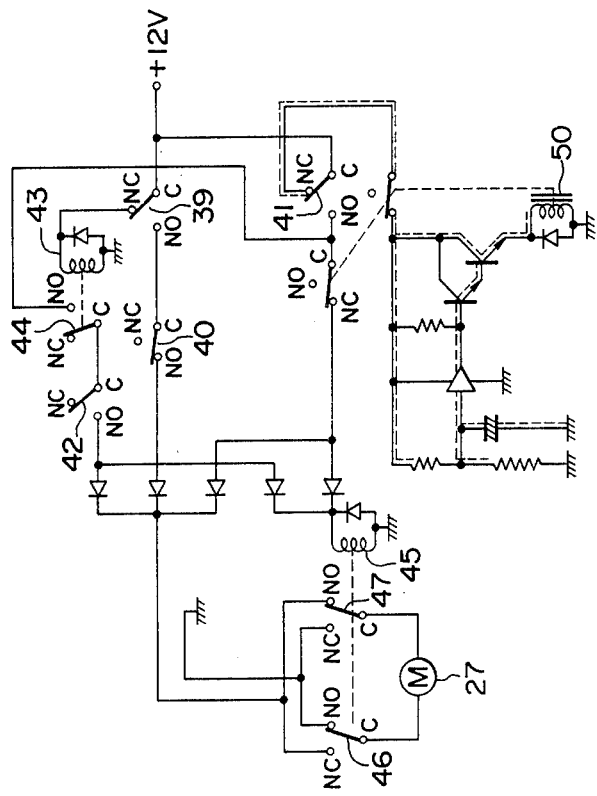
FIG. 12 is an electric circuit diagram showing the loading release operation state of the control circuit of the same apparatus.
Figure 13:
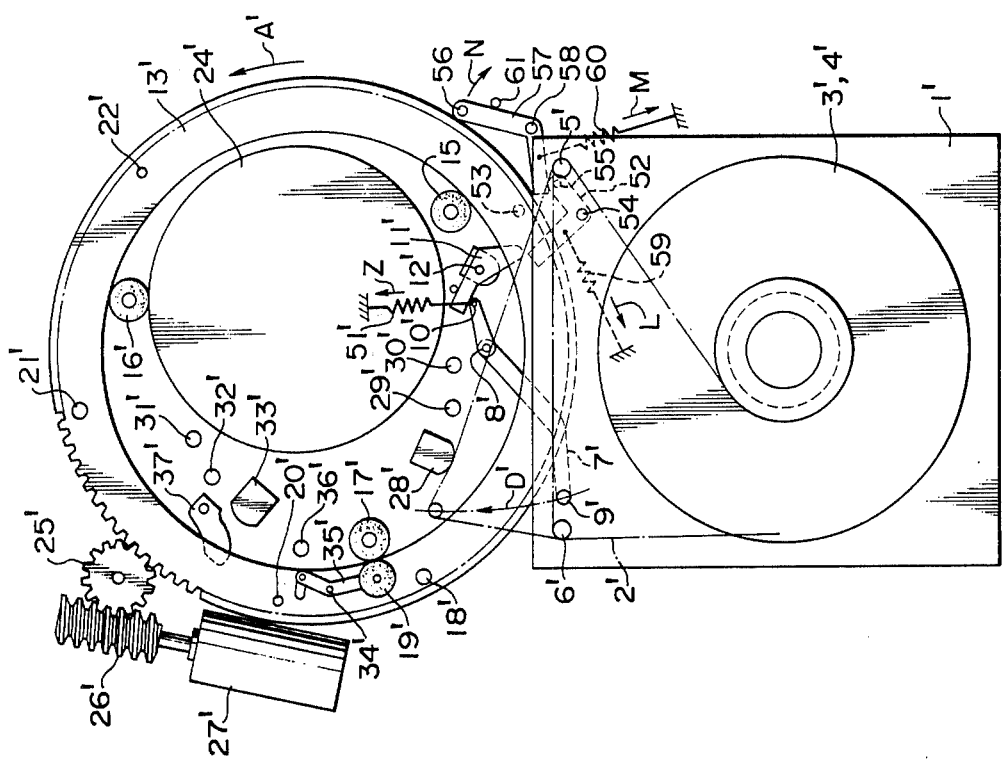
FIG. 13 is a plan view of a magnetic recording-reproducing apparatus having a tape antislack means according to another embodiment of this invention showing the position before loading.

Besides the above-described embodiment, in what follows, other embodiments of this invention will be explained in detail with reference to FIGS. 12 to 14. In these Figures, like constitutional elements as those shown in FIGS. 1 to 9 are designated by like reference numerals provided with prime mark.

Reference numeral 52 denotes a tape anti-slacking lever, which is rotatably mounted on a shaft 54. One end of the lever 52 can be engaged with a pin 53 which is mounted on the rotary ring 13, while on the other end thereof a pin 55 is mounted. Numeral 56 is a tape anti-slacking pin, which is mounted on an idle end of a lever 57. This lever 57 is rotatably mounted on a shaft 58 so that the other end of the lever 57 can be engaged with the pin 55. The anti-slacking lever 52 is elastically held by a spring 59 in a direction L, while the lever 57 is similarly held by a spring 60 in a direction M. The elasticity of spring 60 is smaller than that of spring 59. In FIG. 13, the anti-slacking pin 56 receives a rotary force in the N direction. 61 denotes a hold pin of the lever 57. The relation of this anti-slacking device with the operation of the afore-mentioned embodiment is as follows. First, before the start of loading, the tape anti-slacking pin 56 receives the rotary force in the direction N by the elastic force of spring 59, as shown in FIG. 13, so that no hindrance is given to the tape loading operation effected by the afore-mentioned post group. Next, in the state of recording-reproducing, as shown in FIG. 14, the pin 53 mounted on the rotary ring 13 is engaged with one end of the anti-slacking lever 52 to rotate it in the direction P. By this rotation, the engagement between the pin 55 and the lever 57 is released and the lever 57 is rotated in the direction Q by the force of spring 60. Thus, a state where the tape 2 and the anti-slacking pin are in pressure contact with each other is maintained. Next, by instructing the stop operation in the recording-reproduction state, the rotary ring rotates in the reverse direction and moves to the stop-condition position, so that the path of the tape becomes little shorter and a slacking of the tape might occur. However the anti-slacking pin 56 is rotated in the direction Q by the spring 60, as shown in FIG. 14 to prevent such a shortening of the tape path. This simple arrangement guarantees that the tape is free from slack. Further, it is capable of smooth and instantaneous switching from the tape-stop state to the recording-reproducing state. Any damage to the tape which might be caused by its deviation from the tape-running path due to slacking of the tape is prevented.

What is claimed is:

1. A rotary head type magnetic recording and reproducing apparatus for use with a tape cassette having a supply reel, a take-up reel, a magnetic tape wound on said supply and take-up reels and means for feeding said magnetic tape adjacent an opening in one side of said cassette from said supply reel to said take-up reel, said apparatus comprising:

a tape-driving capstan;

a cylinder enclosing a rotary head;

a rotary ring located for rotation around said cylinder;

driving means for selectively rotating said rotary ring in forward and backward directions about said cylinder;

tape pull-out means including a tape pull-out post mounted on said rotary ring for engaging the magnetic tape within said cassette, pulling the tape from said cassette and wrapping it around said cylinder at a predetermined angle in accordance with the rotation of said rotary ring;

a pinch roller supporting arm mounted rotatably on said rotary ring for rotatably supporting thereon a pinch roller;

cam means for engagement with said pinch roller supporting arm after said magnetic tape has been wrapped around said cylinder by rotation of said tape pull-out post in said forward direction on said rotary ring, said cam means rotating said pinch roller supporting arm to place said pinch roller and said capstan into contact with each other during the recording-reproducing mode of said apparatus as said rotary ring rotates in said forward direction for withdrawing said magnetic tape from said cassette, the engagement between said cam means and said pinch roller supporting arm and the engagement between said pinch roller and said capstan being released when said rotary ring is rotated in said backward direction;

a tape anti-slacking pin for contacting said magnetic tape after it has been withdrawn from said cassette to provide tension thereto;

means for releasing said tape anti-slacking pin from contact with said magnetic tape; and means for resetting said releasing means after a predetermined length of said magnetic tape has been withdrawn from said cassette by rotation of said rotary ring for placing said tape anti-slacking pin into pressure contact with said magnetic tape.

2. A rotary head type magnetic recording and reproducing apparatus according to claim 1 wherein said driving means for selectively rotating said rotary ring includes switching means for stopping backward rotation of said rotary ring so that said pinch roller is at a short distance from said capstan, whereby said pinch roller and capstan do not hinder the running of the tape in the fast forward and backward modes.

* * * * *